(12) United States Patent
Lu et al.

(10) Patent No.: US 9,547,809 B2
(45) Date of Patent: Jan. 17, 2017

(54) CARD CONNECTOR PREVENTING SCRAPPING TO CARD INSERTED THEREIN

(71) Applicant: FOXCONN INTERCONNECT TECHNOLOGY LIMITED, Grand Cayman (KY)

(72) Inventors: Cen Lu, Shenzhen (CN); Wang-Ke He, Shenzhen (CN); Wei-De Zhang, Shenzhen (CN)

(73) Assignee: FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 0 days.

(21) Appl. No.: 14/789,031

(22) Filed: Jul. 1, 2015

(65) Prior Publication Data
US 2016/0006158 A1    Jan. 7, 2016

(30) Foreign Application Priority Data

Jul. 1, 2014 (CN) .......................... 2014 1 0307109
Dec. 22, 2014 (CN) ..................... 2014 2 0812498 U (51) Int. Cl.
| H01R 12/00 | (2006.01) |
| H01R 12/00 | (2006.01) |
| G06K 13/08 | (2006.01) |
| H01R 12/71 | (2011.01) |
| H01R 13/405 | (2006.01) |
| H01R 13/24 | (2006.01) |

(52) U.S. Cl.
CPC ............ *G06K 13/08* (2013.01); *H01R 12/714* (2013.01); *H01R 13/2428* (2013.01); *H01R 13/405* (2013.01); *H01R 13/2407* (2013.01); *H01R 13/2464* (2013.01)

(58) Field of Classification Search
USPC ........................................... 439/66, 630, 325
See application file for complete search history.

(56) References Cited

U.S. PATENT DOCUMENTS

| 5,596,170 A * | 1/1997 | Barina ............... H01R 13/2407 174/366 |
| 6,250,933 B1 * | 6/2001 | Khoury .............. G01R 1/06738 324/755.07 |

(Continued)

FOREIGN PATENT DOCUMENTS

| CN | 103050806 | 4/2013 |
| CN | 203690604 | 7/2014 |

(Continued)

*Primary Examiner* — Tho D Ta
(74) *Attorney, Agent, or Firm* — Wei Te Chung; Ming Chieh Chang (57) ABSTRACT

A card connector (100) includes an insulative housing (1) and a number of contacts (2) retained in the insulative housing. The insulative housing defines a receiving space (10), a front-and-rear direction, and a left-and-right direction perpendicular to the front-and-rear direction. Each contact includes a soldering portion (23), two retaining portions (24), and a curved portion (25) connecting between the two retaining portions. The curved portion includes a contacting portion (251) arching upwardly to protrude into the receiving space and two flexible portions (252) integrally formed at two opposite ends of the contacting portion. The two flexible portions are centrosymmetry with respect to the contacting portion.

19 Claims, 11 Drawing Sheets

(56) References Cited

U.S. PATENT DOCUMENTS

| | | | | |
|---|---|---|---|---|
| 6,307,159 | B1 * | 10/2001 | Soejima | H01L 21/4853 |
| | | | | 174/250 |
| 6,328,573 | B1 * | 12/2001 | Sakata | H01R 13/2428 |
| | | | | 439/66 |
| 6,540,524 | B1 * | 4/2003 | Khoury | G01R 1/06733 |
| | | | | 439/591 |
| 6,672,876 | B1 * | 1/2004 | Takekoshi | H01R 13/2407 |
| | | | | 439/66 |
| 7,913,914 | B2 | 3/2011 | Nilsson | |
| 7,967,640 | B2 * | 6/2011 | Hashimoto | H01R 12/714 |
| | | | | 439/630 |

FOREIGN PATENT DOCUMENTS

| | | |
|---|---|---|
| JP | 2011-165560 | 8/2011 |
| TW | M412517 | 9/2011 |
| TW | M472339 | 2/2014 |
| TW | M480784 | 6/2014 |

* cited by examiner

CARD CONNECTOR PREVENTING SCRAPPING TO CARD INSERTED THEREIN

BACKGROUND OF THE INVENTION

1. Field of the Invention

The present invention relates generally to a card connector, and more particularly to a card connector preventing scrapping to card inserted therein.

2. Description of Related Arts

U.S. Pat. No. 7,967,640, Japan Patent Publication No. 2011165560, China Patent Publication No. 103050806, and Taiwan Pat. No. M472339 each disclose an electrical card connector comprising a plurality of elastic terminals. Each elastic terminal has a contacting portion and a pair of flexible arms arching upwardly and backwardly extending to be connected with each other at the contacting portion. The flexible arms are symmetrically positioned at two sides of the contacting portion along a card's insertion/ejection direction. U.S. Pat. No. 7,913,914 issued on Mar. 29, 2011 discloses a contact having an inclined portion substantially U-shaped with two ends forming the legs thereof.

A card connector preventing scrapping to the card when the card is ejected is desired.

SUMMARY OF THE INVENTION

Accordingly, an object of the present invention is to provide a card connector preventing scrapping to the card when the card is ejected.

To achieve the above object, a card connector includes an insulative housing and a number of contacts retained in the insulative housing. The insulative housing defines a receiving space, a front-and-rear direction, and a left-and-right direction perpendicular to the front-and-rear direction. Each contact includes a soldering portion, two retaining portions, and a curved portion connecting between the two retaining portions. The curved portion includes a contacting portion arching upwardly to protrude into the receiving space and two flexible portions integrally formed at two opposite ends of the contacting portion. The two flexible portions are centrosymmetry with respect to the contacting portion.

Other objects, advantages and novel features of the invention will become more apparent from the following detailed description when taken in conjunction with the accompanying drawings.

DETAILED DESCRIPTION OF THE PREFERRED EMBODIMENT

Reference will now be made in detail to the preferred embodiment of the present invention.

Referring to FIGS. 1-7, a card connector 100 of the present invention, used for engaging with two cards 200, comprises an insulative housing 1 with an upper insulative body 11 and a lower insulative body 12 associated with each other for defining a receiving space 10 therebetween, a plurality of contacts 2 comprising a plurality of first contacts 21 retained in the upper insulative body 11 and a plurality of second contacts 22 retained in the lower insulative body 12, a metal shell 3 comprising a top shell 31 attached to the upper insulative body 11 and a bottom shell 32 attached to the lower insulative body 12 for shielding, an ejector 4 assembled at an inner side of the insulative housing 1, and a tray 5 movably received in the receiving space 10. The two cards 200 are carried by the tray 5 to be received in the receiving space 10 along an insertion direction, and are withdrawn from the receiving space 10 by the ejector 4 along an ejection direction opposite to the insertion direction. The insertion/ejection direction is so-called front-and-rear direction.

Figure 3:
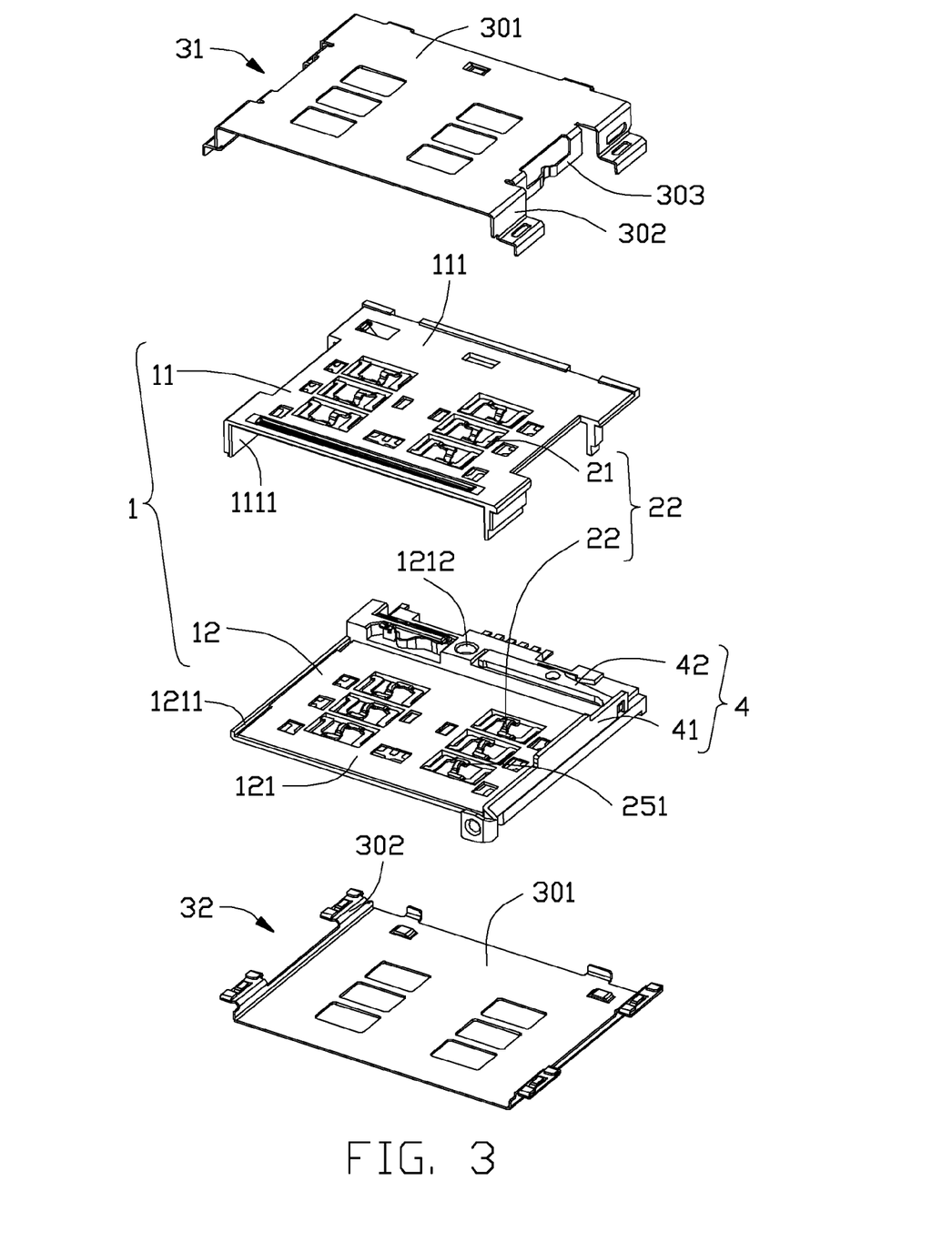
FIG. 3 is a perspective, exploded view of the card connector.
Figure 4:
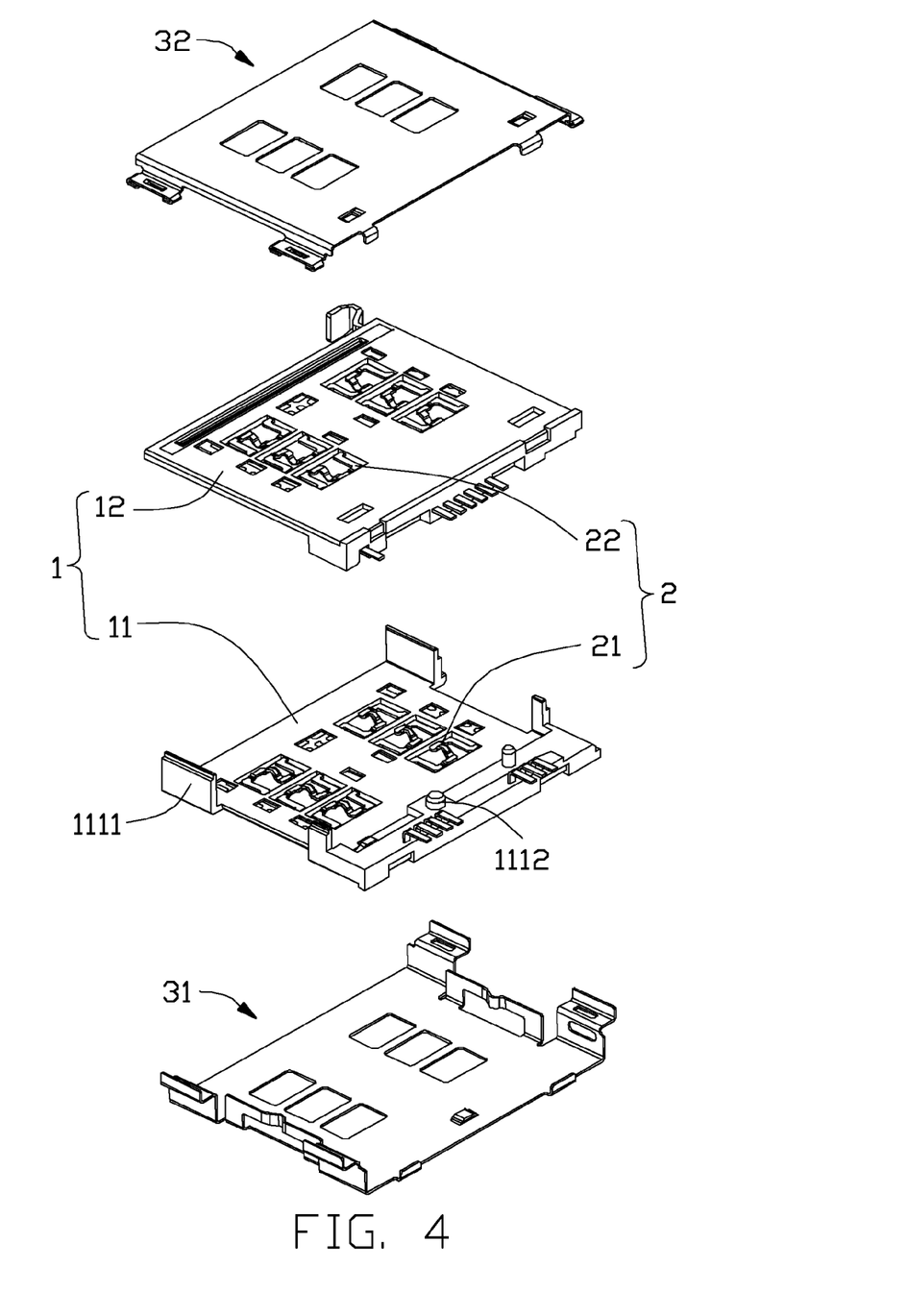
FIG. 4 is similar to FIG. 3, but taken from a different view.

Referring to FIGS. 3 and 4, the lower insulative body 12 of the insulative housing 1 comprises a flat bottom wall 121. The lower insulative body 12 defines a slit 1211 at two opposite left and right sides of the bottom wall 121 and a rear aperture 1212 at a rear side of the bottom wall 121. The upper insulative body 11 of the insulative housing 1 comprises a flat top wall 111, a pair of sidewalls 1111 extending downwardly from two lateral sides of the top wall 111 into the slit 1211, and a post 1112 extending downwardly from a rear part of the top wall 111 into the aperture 1212. Therefore, the upper insulative body 11 is firmly secured with the lower insulative body 12.

Figure 5:
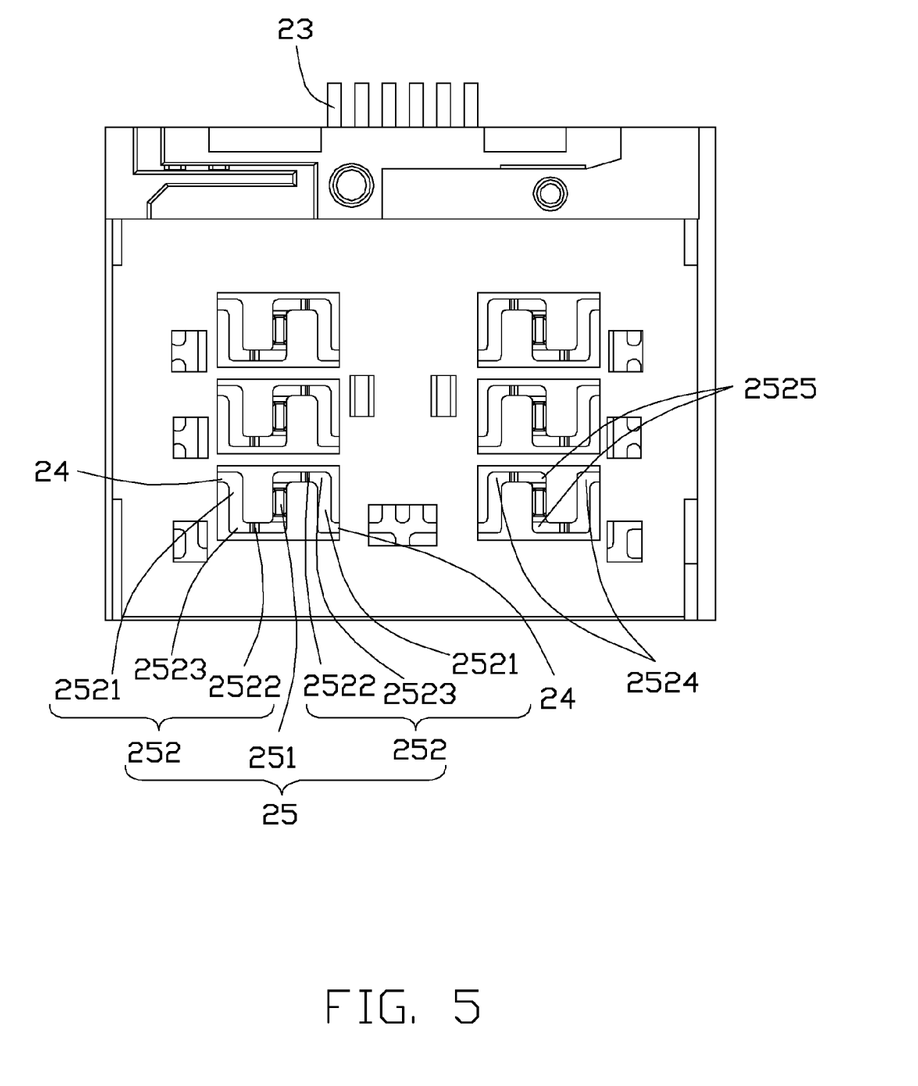
FIG. 5 is a perspective, assembled view of a plurality of contacts retained in an insulative housing of the card connector.
Figure 6:
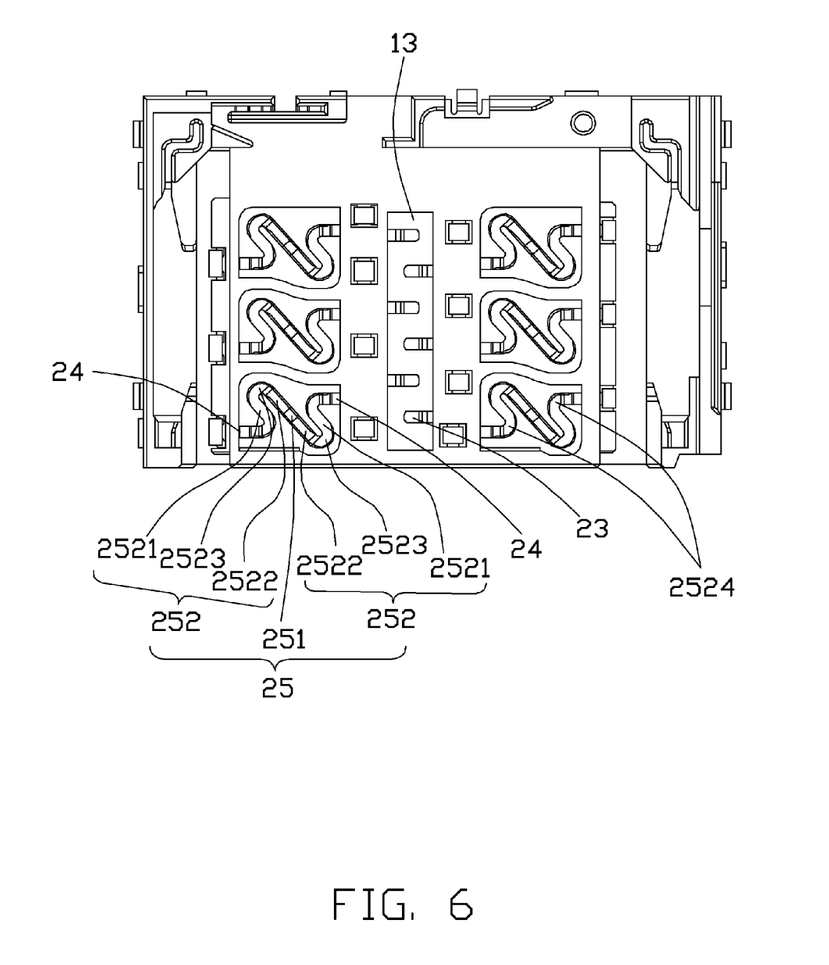
FIG. 6 is similar to FIG. 5, but showing a second embodiment of the contacts retained in an insulative housing of the card connector.

Referring to FIGS. 3-6, the first contacts 21 retained in the upper insulative body 11 and the second contacts 22 retained in the lower insulative body 12 are same to each other. Each of the contacts 2 (the first contacts 21 and the second contacts 22) comprises a soldering portion 23, two retaining portions 24, and a curved portion 25 connecting between the two retaining portions 24. The curved portion 25 has a contacting portion 251 arching upwardly to protrude into the receiving space 10. The curved portion 25 provides enough elasticity of the contact 2 in so small space. The curved portion 25 has two flexible portions 252 at two opposite ends of the contacting portion 251. The contacting portions 251 extend beyond the corresponding insulative body 11, 12 while the flexible portions 252 do not extend beyond the corresponding insulative body 11, 12 for preventing scrapping to the inserted cards 200. Referring to FIG. 5, the curved portion 25 is substantially S-shaped. Referring to FIG. 6, the curved portion 25 is substantially Z-shaped. The S-shaped curved portion 25 comprises a pair of first linear portion 2521 right-angled connecting to the retaining portions 24 and extending along the front-and-rear direction, a pair of second linear portions 2522 transversely connecting between the first linear portions 2521 and the contacting portion 251 and extending along a left-and-right direction perpendicular to the front-and-rear direction, and the contacting portion 251 extends along the front-and-rear direction. The Z-shaped curved portion 25 comprises a pair of first linear portions 2521 connecting to the retaining portions 24 and extending along a diagonal direction both oblique to the left-and-right direction and the front-and-rear direction, a pair of second linear portions 2522 connecting between the first linear portions 2521 and the contacting portion 251 and extending along the same diagonal direction, and the contacting portion 251 substantially positioned in a straight line as the pair of second linear portions 2522.

Referring to FIGS. 5 and 6, the two retaining portions 24 are positioned at two sides of the contacting portion 251 along the left-and-right direction and also positioned at two sides of the contacting portion 251 along the front-and-rear direction. Each contact 2 of FIGS. 5 and 6 comprises a first corner portion 2523 connecting between each first linear portion 2521 and the corresponding second linear portion 2522. The two first corner portions 2523 are positioned at two sides of the contacting portion 251 along the left-and-right direction and also positioned at two sides of the contacting portion 251 along the front-and-rear direction. Each contact 2 of FIGS. 5 and 6 further comprises a second corner portion 2524 connecting between each first linear portion 2521 and the corresponding retaining portion 24. The second corner portions 2524 of FIG. 6 extend oppositely towards the contacting portion 251. Therefore, the contact 2 undertakes balanced force from the inserted card 200 and is prevented from being totally deformed. A difference between the S-shaped contact 2 of FIG. 5 and Z-shaped contact 2 of FIG. 6 is that, the contact 2 of FIG. 5 comprises a third corner portion 2525 connecting between each second linear portion 2522 and the contacting portion 251 while the contact 2 of FIG. 6 does not. The contacting portion 251 is substantially positioned in a straight line as the pair of second linear portions 2522.

Referring to FIG. 5, the soldering portions 23 extend outside of the insulative housing 1 and are positioned in a straight line for facilitating soldering. Referring to FIG. 6, the insulative housing 1 defines a lengthwise slot 13 spacing the two rows of the contacts 2 in the left-and-right direction and the soldering portions 23 extend into the lengthwise slot 13 for space saving. Each soldering portion 23 is alternatively connected to one of the corresponding retaining portions 24. Each soldering portion 23 is connected to the retaining portions 24 in another embodiment.

Referring to FIGS. 3 and 4, the metal shell 3 comprises a top shell 31 attached to the upper insulative body 11 and a bottom shell 32 attached to the lower insulative body 12. Each of the top shell 31 and the bottom shell 32 comprises a base portion 301 and a pair of vertical portions 302. At least one of the top shell 31 and the bottom shell 32 comprises an elastic locking beam 303.

Figure 1:
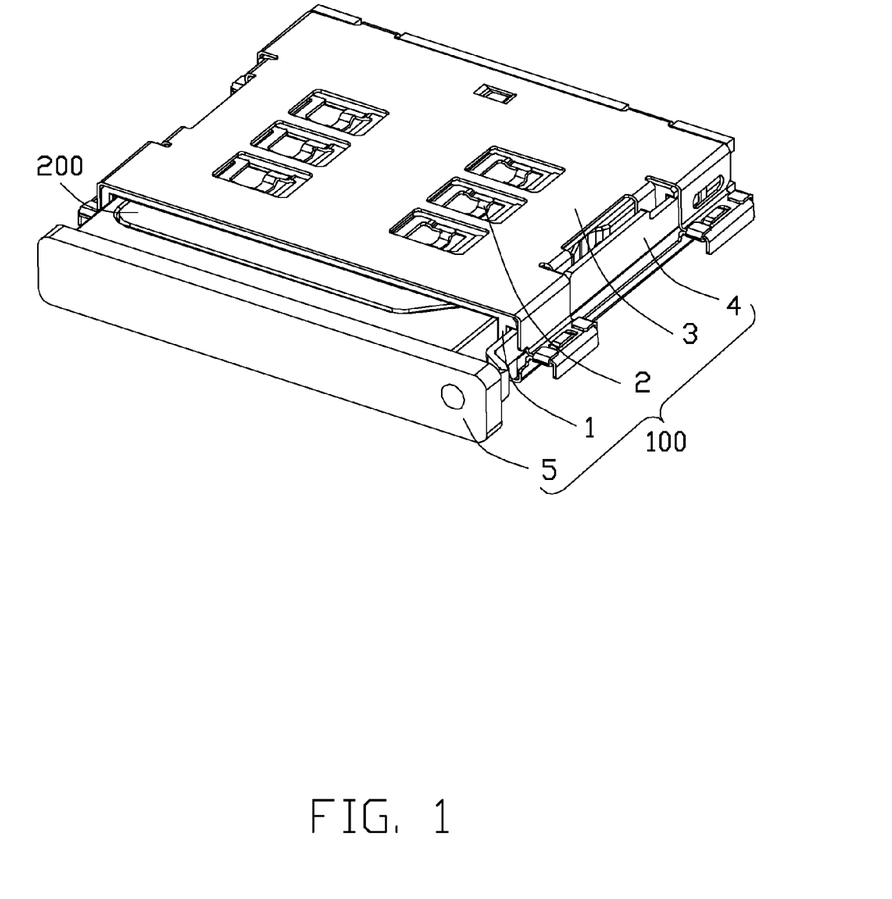
FIG. 1 is a perspective, assembled view of a card connector constructed in accordance with the present invention when two cards are inserted in the card connector.
Figure 2:
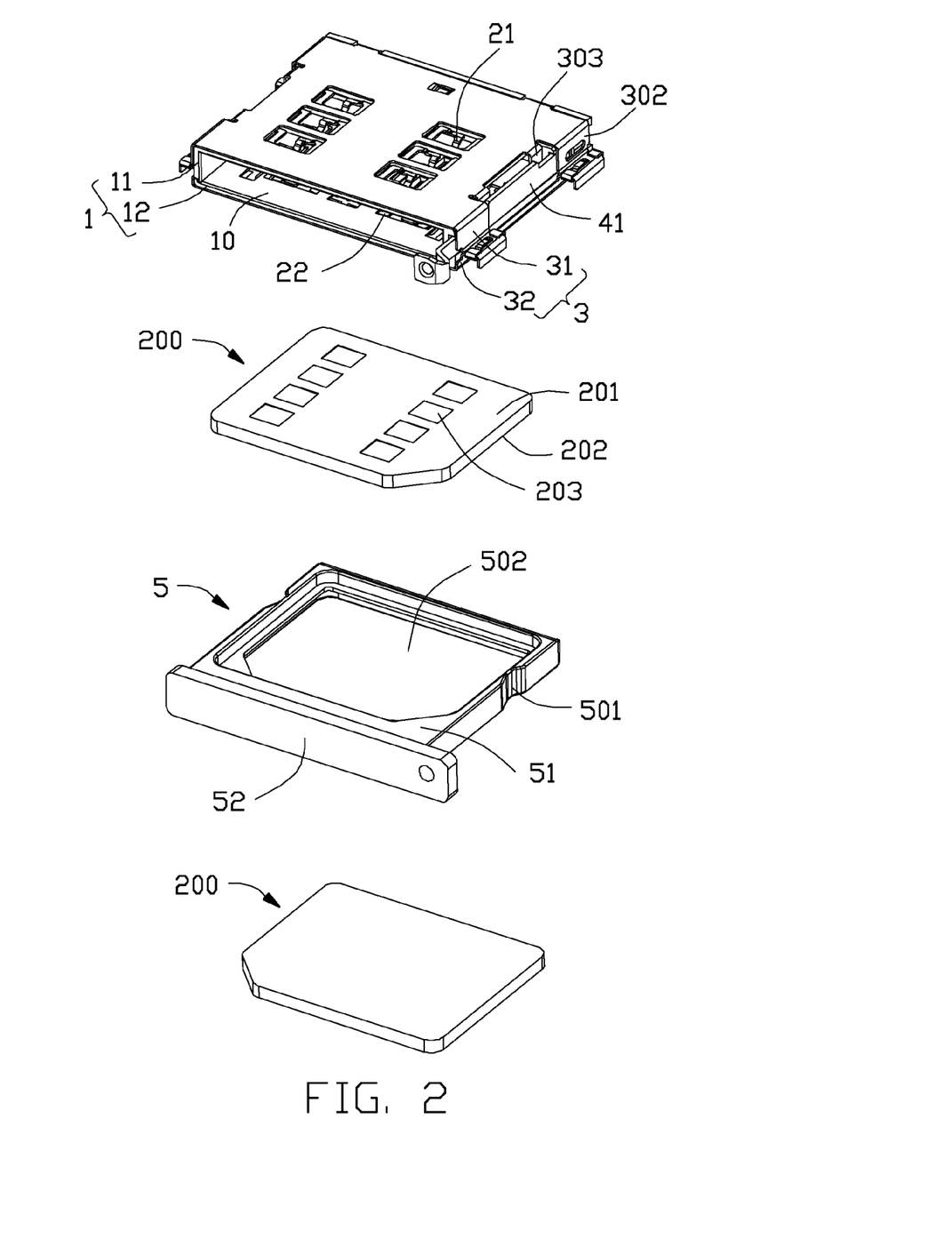
FIG. 2 is a perspective, partly exploded view of the two cards and the card connector of FIG. 1.

Referring to FIG. 2, the tray 5 comprises a main frame 51 and a door portion 51 formed at a front side of the main frame 51. The main frame 51 defines a slit 501 correspondingly receiving the elastic locking beam 303. The main frame 51 defines two receiving channels 502 oppositely located in an upper-and-lower direction perpendicular to both the left-and-rear direction and the front-and-rear direction. The receiving channels 502 are used for respectively receiving the two cards 200. The card 200 includes a first surface 201 having electrical pads 203 connected with the correspondingly contacts 2 and a second surface 202 connected with the tray 5.

Referring to FIGS. 2 to 4, the ejector 4 comprises a shaft 41 and an actuator 42 pivoting with the shaft 41. The shaft 41 is positioned between the door portion 51 and the actuator 42 along the front-and-rear direction. The shaft 41 is positioned between the adjacent vertical portion 302 and the elastic locking beam 303 along the left-and-right direction.

Figure 7:
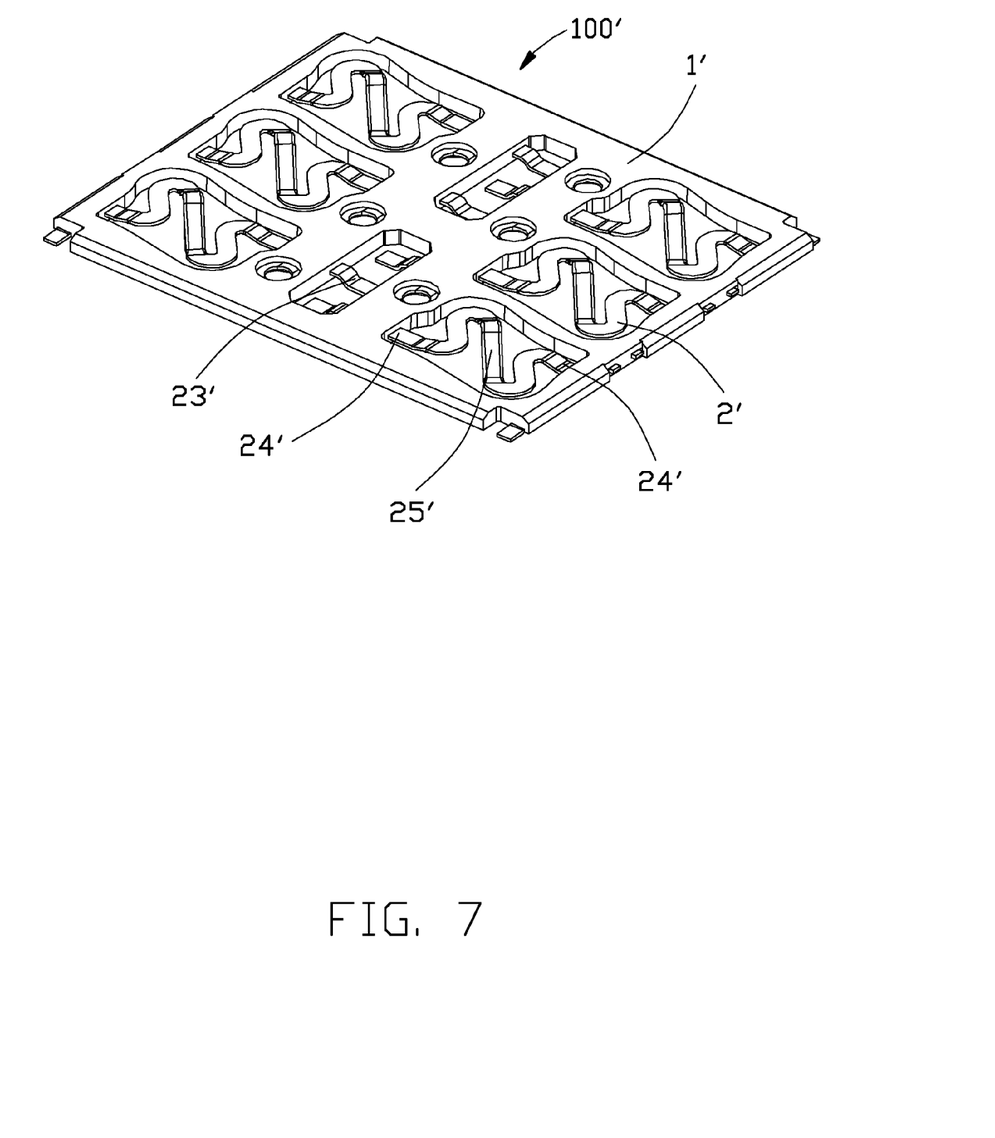
FIG. 7 is similar to FIG. 5, but showing a third embodiment of the contacts retained in an insulative housing of the card connector.
Figure 8:
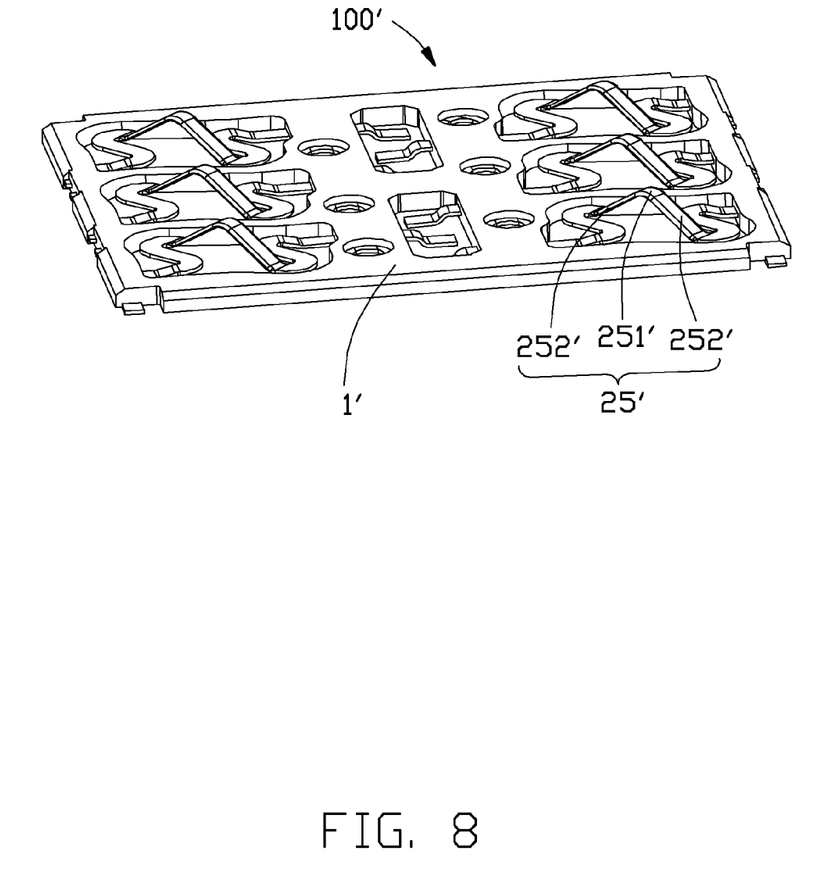
FIG. 8 is similar to FIG. 7, but taken from a different view.
Figure 9:
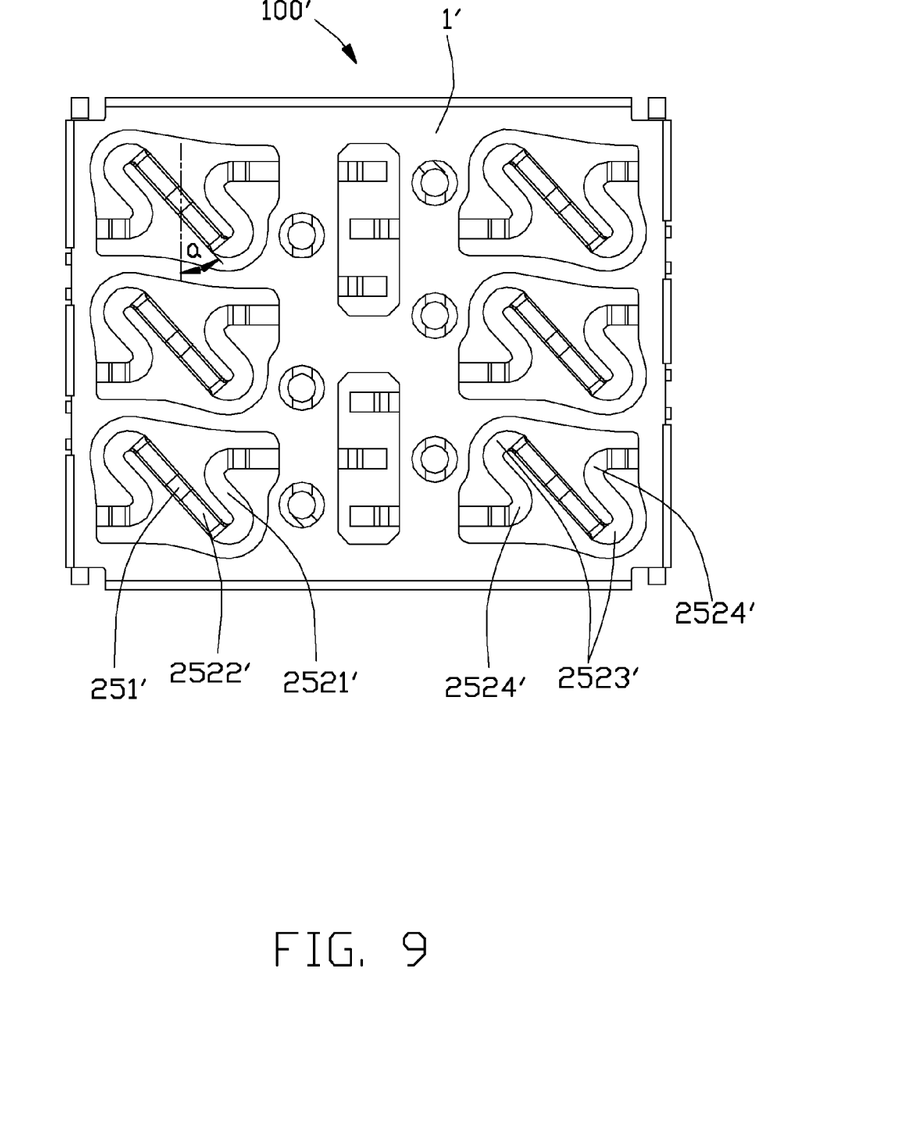
FIG. 9 is a top, elevational view of FIG. 7.

FIGS. 7 to 9 show a third embodiment of the present invention. The card connector 100' comprises an insulative housing 1' and a plurality of contacts 2' retained in the insulative housing 1'. The contacts 2' of the third embodiment are same to the contacts 2 of FIG. 6. The third embodiment is different from the two above-mentioned embodiments in the insulative housing 1'. The insulative housing 1' is flat shaped and defines a plurality of passageways 10'. The insulative housing 1' has a first end 11', a second end 12', a third end 13', and a fourth end 14' along a clockwise direction. The card 200 (shown in FIG. 1) is capable of being inserted into the card connector 100' through each of the first end 11', the second end 12', the third end 13', and the fourth end 14' and not scrapping with the contacts 2 because the contacting portion 251' is connected with two flexible portions 252' and the two flexible portions 252' extend in a diagonal direction oblique to both the left-and-right direction and the front-and-rear direction.

Figure 10:
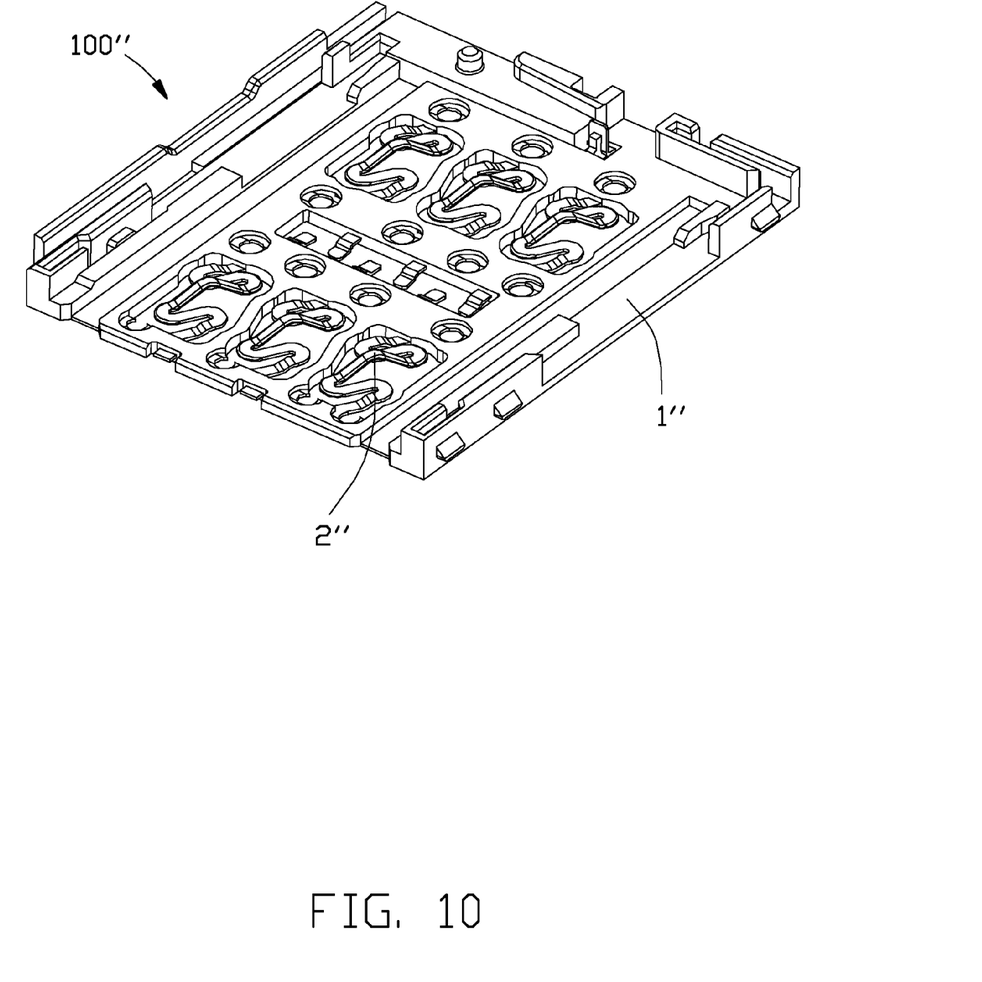
FIG. 10 is similar to FIG. 5, but showing a fourth embodiment of the contacts retained in an insulative housing of the card connector.
Figure 11:
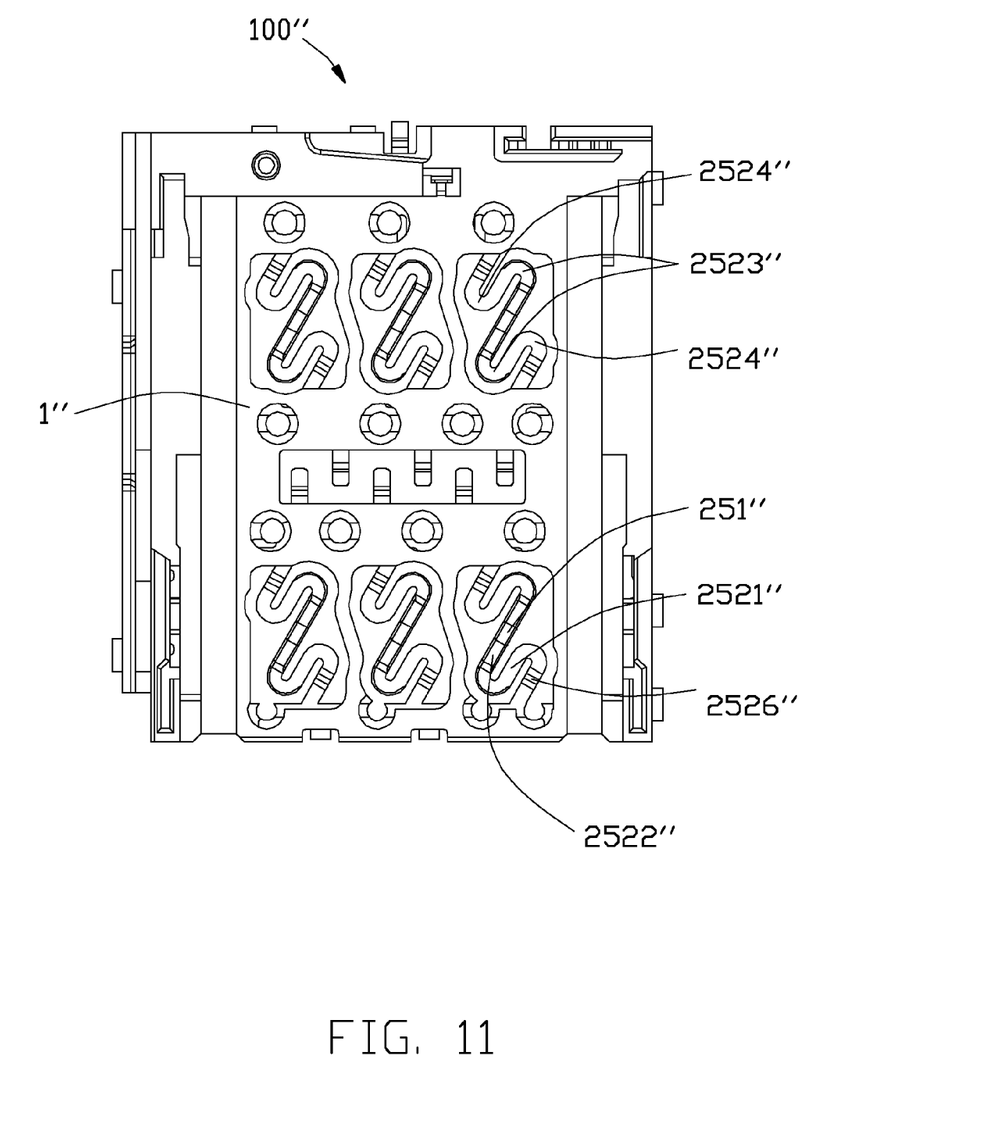
FIG. 11 is a top, elevational view of FIG. 10.

FIGS. 10 and 11 show a fourth embodiment of the present invention. The contact 2" of the fourth embodiment is different from the above-mentioned contacts 2, 2' of the second and third embodiments in that: the second corner portion 2524" of the contact 2" is smaller than that of the contact 2, 2' of the second and third embodiments such that a third linear portion 2526" is defined from the second corner portion 2524" to the corresponding retaining portion 24" and is parallel with the first linear portion 2521" and the second linear portion 2522". The contacts 2" are basically moved from FIG. 6 for a right angle along the clockwise direction.

In the above four embodiments, the two flexible portions 252, 252', 252" are centrosymmetry with respect to the contacting portion 251, 251', 251". The connections of the symmetrical points of the projection of the flexible portions 252, 252', 252" in a horizontal surface are all through and are equally divided by that of the contacting portion 251, 251', 251".

While a preferred embodiment in accordance with the present invention has been shown and described, equivalent modifications and changes known to persons skilled in the art according to the spirit of the present invention are considered within the scope of the present invention as described in the appended claims.

What is claimed is:
1. A card connector comprising:
an insulative housing defining a receiving space, a front-and-rear direction, and a left-and-right direction perpendicular to the front-and-rear direction, the insulative housing having a base with a plurality of openings therein; and
a plurality of contacts each comprising a soldering portion, two retaining portions retained to the base of the insulative housing, and a curved portion between the two retaining portions, the soldering portion connected to one of the two retaining portions, the curved portion exposed within a corresponding opening and comprising a contacting portion arching upwardly to protrude into the receiving space and two flexible portions integrally formed at two opposite ends of the contacting portion, wherein one of the two flexible portions of the contact curved portion is centrosymmetry to the other flexible portion with respect to a line passing through the contacting portion and along a direction orthogonal to the front-and-rear and left-and-right directions; and a direction along which the contacting portion extends intersects with a direction along which the retaining portion extends.

2. The card connector as claimed in claim 1, wherein the contact comprises a pair of first linear portions, a pair of second linear portions, a first corner portion connected between each first linear portion and a corresponding second linear portion, and a second corner portion connected between each first linear portion and a corresponding retaining portion.

3. The card connector as claimed in claim 2, wherein the contacting portion extends along the front-and-rear direction.

4. The card connector as claimed in claim 3, wherein the first linear portion connects right-angled to the retaining portion and extends along the front-and-rear direction.

5. The card connector as claimed in claim 3, wherein the second linear portion transversely connects between the first linear portion and the contacting portion and extends along the left-and-right direction.

6. The card connector as claimed in claim 5, wherein the contact comprises a third corner portion connecting between each second linear portion and the contacting portion.

7. The card connector as claimed in claim 2, wherein the first linear portion connects to the retaining portion and extends along a diagonal direction oblique to both the left-and-right direction and the front-and-rear direction.

8. The card connector as claimed in claim 7, wherein the contacting portion is substantially positioned in a straight line as the pair of second linear portions.

9. The card connector as claimed in claim 8, wherein a third linear portion is defined from the second corner portion to the corresponding retaining portion and the third linear portion is parallel with the first linear portion and the second linear portion.

10. The card connector as claimed in claim 8, wherein the insulative housing has, along a clockwise direction, a first end, a second end, a third end, and a fourth end each for inserting a card without scrapping the contacts.

11. An electronic card connector comprising:
an insulative housing having a base with a plurality of openings therein and further defining a card receiving cavity confronting the base in a vertical direction, said card receiving cavity defining a card insertion direction perpendicular to said vertical direction, and a transverse direction perpendicular to both said vertical direction and said card insertion direction;
a plurality of contacts disposed in the housing, each of said contacts including a curved section exposed within the corresponding opening and having a pair of flexible sections with a contacting section between the flexible sections, the contacting section extending into the card receiving cavity in the vertical direction in a deflectable manner;
a pair of retention sections unitarily extending from and located by two opposite outer ends of the pair of flexible sections and snugly retained within the base via an insert-molding process; and
a soldering section unitarily extending from one of said retention sections;
wherein said opposite outer ends of the pair of flexible sections exposed in the corresponding opening, are essentially diagonal with each other with respect to said card insertion direction, and each of said pair of flexible sections forms at least one backward extension extending at least in the card insertion direction to increase flexibility of the whole curved section.

12. The electronic card connector as claimed in claim 11, wherein said backward extension extends further in the transverse direction so as to comply with a position of the corresponding retention sections.

13. The electronic card connector as claimed in claim 11, wherein the contacting section extends essentially in an oblique direction oblique to both the card insertion direction and the transverse direction in a top view.

14. The electronic card connector as claimed in claim 13, wherein the backward extension extends along said oblique direction.

15. The electronic card connector as claimed in claim 14, wherein each of said pair of flexible sections further includes another backward extension reverse to said backward extension in said oblique direction.

16. An electronic card connector comprising:
an insulative housing having a base with two rows of openings therein and further defining a card receiving cavity confronting the base in a vertical direction, said card receiving cavity defining a card insertion direction perpendicular to said vertical direction, and a transverse direction perpendicular to both said vertical direction and said card insertion direction;
two rows of contacts disposed in the housing, each of said contacts including a curved section exposed within the corresponding opening and having a pair of flexible sections with a contacting section between the flexible sections, the contacting section extending into the card receiving cavity in the vertical direction in a deflectable manner;
a pair of retention sections unitarily extending from and located by two opposite outer ends of the pair of flexible sections and snugly retained within the base via an insert-molding process; and
a soldering section unitarily extending from one of said retention sections, the soldering sections of said two rows of contacts being arranged in one row which extends along the card insertion direction and is located between said two rows of openings in said transverse direction; wherein said two rows of openings are arranged with pairs and the openings in each pair are aligned with each other in said transverse direction, and said two rows of contacts are correspondingly arranged with pairs and the contacts in each pair are aligned with each other in said transverse direction; wherein
said opposite outer ends of the pair of flexible sections exposed in the corresponding opening, are essentially diagonal with each other with respect to said card insertion direction so as to have the two soldering sections of each pair of said paired contacts offset from each other in the card insertion direction for facilitating an arrangement of the soldering sections of all contacts in said one row.

17. The electronic card connector as claimed in claim 16, wherein the contacting section extends essentially along an oblique direction oblique to both said card insertion direction and said transverse direction.

18. The electronic card connector as claimed in claim 16, wherein each flexible section includes a backward extension extending at least along the card insertion direction for enhancing flexibility of the whole curved section.

19. The electronic card connector as claimed in claim 18, wherein said backward extension further extends in the transverse direction for approaching the corresponding retention section.

* * * * *